United States Patent [11] 3,624,179

[72] Inventor Clifford C. Carroll
 Spartanburg, S.C.
[21] Appl. No. 830,087
[22] Filed June 3, 1969
[45] Patented Nov. 30, 1971
[73] Assignee Deering Milliken Research Corporation
 Spartanburg, S.C.

[54] STABILIZED POLYURETHANE
 11 Claims, No Drawings
[52] U.S. Cl. .................................................. 260/830 P,
 115/138.8 D, 260/45.95, 260/849, 260/858
[51] Int. Cl. ................................................... C08g 51/58
[50] Field of Search ......................................... 260/45.95,
 45.7 P, 2.5 AJ, 2.5 BB, 830 P, 849, 858; 117/138.8

[56] References Cited
 UNITED STATES PATENTS
3,428,480  2/1969  Wagner et al. ............. 260/45.7 P
3,434,981  3/1969  Baramauckas et al. ....... 260/45.7 P

*Primary Examiner* — Donald E. Czaja
*Assistant Examiner* — V. P. Hoke
*Attorneys* — H. William Petry and Norman C. Armitage ABSTRACT: A shaped structure of spandex-type elastomers stabilized against discoloration by treatment with a phosphonium compound having the formula:
[RCH(OH)]c-4P$^+$X$^-$
wherein R is hydrogen or an alkyl radical and X is a halogen or a hydroxy radical. In addition to these phosphonium compounds, the structures also may be treated with a polymeric binder material which results in improved stabilization and durability.

STABILIZED POLYURETHANE

BACKGROUND OF THE INVENTION

This invention relates to color-stabilized shaped structures of long chain synthetic elastomers which comprise at least 85 percent of a segmented polyurethane, and more particularly, to the stabilization of such elastomers through the use of particular phosphonium salt compounds.

Long chain synthetic elastomers comprising at least 85 percent of a segmented polyurethane, generically referred to in the industry as "spandex" materials, can be formed into shaped structures such as molded objects, films, filaments, fibers, bristles, felts, and similar structures useful in a variety of applications. The structures exhibit desirable elastic properties and fibers and filaments of these elastomers have found wide acceptance in the women's undergarment industry as a result of their elasticity. One of the major problems associated with these materials is the tendency of the spandex to discolor on storage and upon exposure to atmospheric conditions. The discoloration primarily is in the form of an undesirable yellowing of the filaments and fibers. Thus it is common to witness the discoloration of white undergarments containing spandex even before the first wearing or laundering.

It has been suggested that the discoloration may be offset somewhat by tinting the fibers or through the use of other masking agents. However, such materials may cause the fibers to display other undesirable color characteristics since they do not inhibit the formation of the yellow color but merely mask the yellow color once it is formed.

In U.S. Pat. No. 3,133,036, a procedure for obtaining color-stabilized segmented polyurethane elastomers is described utilizing an essentially colorless leuco derivative of a blue-violet dye. The leuco derivative is converted to the dye by the oxidative action of nitric fumes or chlorine thereby masking any yellowing of the elastomer. In accordance with U.S. Pat. No. 3,230,193, stabilization of such elastomers is accomplished by incorporating therein triarylphosphines. Benzanilide is described as a stabilizing additive in U.S. Pat. No. 3,095,322. It is known also that various derivatives of hydrazides may be used to stabilize the elastomers.

SUMMARY OF THE INVENTION

In accordance with the present invention, color stabilized shaped structures of long chain synthetic elastomers comprising at least 85 percent of a segmented polyurethane are obtained by treating the elastomers with a phosphonium compound having the structure

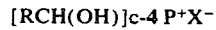

wherein R is hydrogen or an alkyl radical and X is a hologen or a hydroxy radical. The phosphonium compound is applied to the elastomer by any of the known techniques such as by exhaustion from an aqueous bath or by padding. In addition to the phosphonium compound, the composition applied to the elastomers may also contain polymeric binder materials such as aminoplast resins. These latter compositions provide improved color stabilization and washability to the treated elastomers.

DESCRIPTION OF THE PREFERRED EMBODIMENTS

The shaped structures prepared and treated in accordance with the invention may be in the form of filaments, fibers or films prepared, for example, by molding. The elastomers may be treated alone or may be incorporated in structures, such as fabrics, containing fibers of different compositions. Both natural and synthetic fibers, as well as blends thereof, may be included with the elastomers in the preparation of fabrics without imparing the stabilization of the elastomer. One class of fabrics which can be readily color-stabilized by the invention, are the powernet fabrics. The powernet fabrics are those known in the industry as the Raschel knitted fabrics, e.g., the four-bar Raschel fabrics, having spandex, rubber, or other elastic fibers within the fabric. An example of such a fabric is one comprised of nylon and spandex fibers.

The term "spandex fiber," which is used in this specification and in the claims, is used in its generic sense to define a manufactured fiber in which at least 85 percent of the fiber-forming substance is a long-chain synthetic segmented polyurethane. The discussion, however, of spandex fibers is applicable also to other structures of such segmented polyurethanes since the stabilization is achieved with any shape such as films and the like.

The segmented polyurethanes which provide spandex fibers contain the recurring linkage —OCONH—. The preferred spandex fibers are those prepared from segmented polyurethanes in which the urethane nitrogen is joined to an aromatic radical which is further attached to a ureylene linkage —NHCONH—. Although these fibers exhibit the most desirable properties, they do suffer the disadvantage of being very susceptible to the degradative action of acid fumes. In general, the segmented polyurethanes are prepared from hydroxy-terminated prepolymers such as hydroxy-terminated polyethers and polyesters of low molecular weight. Reaction of the prepolymer with a molar excess of an inorganic diisocyanate, preferably an aromatic diisocyanate, produces an isocyanate-terminated polymeric intermediate which may then be chain extended with a difunctional active hydrogen-containing compound such as water, hydrazine, organic diamines, glycols, and amino alcohols.

The preparation of various types of segmented polyurethanes of the types treated in accordance with this invention is the subject matter of considerable prior art including the following U.S. Pat. Nos.: 9,292,801; 2,929,802; 2,929,803; 2,929,804; 2,953,839; 2,957,852; 2,962,470; 2,999,839; and 3,009,901. These patents describe the segmented polyurethane elastomers as being comprised of amorphous segments derived from polymers having a melting point below 50° C. and a molecular weight above 600, and containing from about 5 to 40 percent of crystalline segments derived from a polymer having a melting point above 200° C. in the fiber-forming molecular weight range. Most of the polyurethanes have elongations, in filament form, greater than 150 percent, tensile recoveries of over 90 percent, and stress decays of less than 20 percent, as defined in U.S. Pat. No. 2,957,852.

The phosphonium compounds applied to the shaped structures in accordance with the present invention are phosphonium salts having the formula

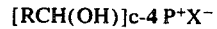

wherein R is hydrogen or an alkyl radical and X is a halogen or a hydroxy radical. The alkyl radicals are preferably lower alkyl radicals containing, for example, from one to about 10 or 15 carbon atoms. The alkyl radicals may be straight chain or branched alkyl radicals. Phosphonium salts of this type are prepared from the reaction of phosphine with an aldehyde (RCHO) and a mineral acid in an inert solvent such as tetrahydrofuran. This procedure is described in detail in U.S. Pat. No. 3,013,085. Typical examples of such phosphonium salts include the following where R is $nC_5H_{11}$ and X is chlorine; R is $n\text{-}C_3H_7$ and X is bromine; and R is $n\text{-}C_5H_{11}$ and X is iodine. The corresponding hydroxy derivatives are obtained by hydrolysis of the corresponding halides. In the presence of alkali metal hydroxides or neutral carbonates, the salts are transformed to more complex mixtures containing tris (hydroxyalkyl) phosphine oxides, aldehydes and hydrogen. Thus, some of the phosphine oxide may also be deposited on the elastomers by the process of the invention.

The phosphonium salts may be applied to the shaped structures by a variety of procedures. The salts may be dissolved in a solution of a segmented polyurethane prior to formation of the fibers or filaments, although the structures are preferably treated by other methods. For example, when treating fibers or filaments, the phosphonium salt can be dissolved in a suitable organic solvent which does not react with the fibers, or the phosphonium salts may be dissolved in water and the fibers or fabrics treated by passing them through one of the treating solutions containing the phosphonium salts. In such "dipping" or "exhaustion" techniques, the fiber is maintained in contact with the solution for a period of time sufficient to insure that the desired amount of the phosphonium salt is retained by the fiber upon being removed from the solution. The required amount of phosphonium salt is that amount which is necessary to color stabilize the fibers. Generally, amounts of from about 1.0 to about 15 percent and more preferably up to about 10 percent of the phosphonium salts based on the weight of the elastomer in the structure are sufficient to provide the required stabilization. The time, therefore, may vary from a few seconds to an hour or more with the solution being maintained at room temperature.

Alternatively, the phosphonium salts can be applied to the shaped structures by padding, brushing, printing, etc. Padding is a particularly preferred process where the composition applied to the structure contains a polymeric binder material in addition to the phosphonium salts and where the structure is a fabric. The polymeric binder materials utilized in the invention include both monomers and polymers which when applied to the structures and reacted under the proper conditions, undergo polymerization and/or condensation whereby they are transformed to the thermoset state. Polymeric materials that may be employed in accordance with the present invention include epoxy, acetal, and aminoplast resins. The aminoplast resins are preferred, and examples of these nitrogen containing resins include the urea-formaldehyde adducts such as propyleneurea-formaldehyde and dimethylolurea; melamine-formaldehyde resins such as trimethylol melamine; ethyleneurea-formaldehydes such as dimethylolethyleneurea; alkylol amides such as methylol formamide; alkylol acrylamides such as N-methylolacrylamide; triazones such as dimethylol-N-ethyl triazone; and urons such as dimethyloluron. Mixtures of such resins are also useful in the invention.

The amount of the binder material employed in the invention is primarily determined by the nature of the structure being treated and the ultimate use of the structure. Small amounts of the binder afford some improvement whereas larger amounts may afford greater improvement. However, the larger amounts of binder generally adversely affect the hand of the fabric. Therefore, the amount of binder employed is preferably that which will afford the desired amount of binding while not adversely affecting the aesthetic properties. Generally, the amount of binder utilized will be up to about 20 or 30 percent by weight with amounts between 2 and 10 percent by weight of the structure being preferred.

When polymeric materials are included in the compositions applied to the structures of the invention, catalysts may be included also. The nature of the catalyst employed depends on the specific polymeric binder material. For example, if the binder material has a functional group that is reactive under acidic conditions, then an acid catalyst is used. On the other hand, when a functional group is present that is reactive under alkaline conditions, then a base catalyst is used. The most common acid acting catalysts are the metal salts such as magnesium chloride, zinc nitrate and zinc fluoroborate, or the amino salts such as monoethanolamine hydrochloride and 2-amino-2-methylpropanol. Base acting catalysts include alkali metal salts such as alkali metal carbonates which decompose at temperatures in excess of about 80° C. to form a stronger base alkali metal oxide. Additional base acting catalyst include potassium bicarbonate, sodium silicate, alkali metal phosphates and quaternary ammonium hydroxides. The amount of catalyst incorporated in the compositions applied to the structures of the invention is that normally used to activate a particular binder material. Generally, up to about 15 percent by weight of the catalyst is included in the application solution with a preferred range being from about 0.1 to about 7 percent.

As mentioned previously, the principal advantage obtained by the present invention is the preparation of synthetic elastomeric structures which are stabilized from yellowing due to gas fumes. It has been found also that the process of the invention provides color-stabilized elastomeric structures exhibiting the desired stabilization and having improved durability to washing. Particularly improved results are obtained when the phosphonium salt is used in conjunction with the polymeric binder material. Color stabilization obtained from this combination is better than the stabilization obtained through the use of either of the components.

The ability of the treated structures of this invention to resist yellowing is determined by subjecting treated samples to an accelerated fume-fading test in accordance with the procedure described on pages B-87 to B-89 of the Technical Manual of the American Association of Textile Chemists and Colorists, Volume 44(1968). This standard test procedure is identified as AATCC Standard Test Method 23-1962. In this test, test specimens are suspended in a gas fading test chamber, and a gas burner is lighted to generate fumes comprising the oxides of nitrogen. The length of exposure of these fumes may be varied depending on the particular specimens being tested and the objectives of the test. In the particular examples which follow, all of the test samples were exposed for 16 hours unless otherwise indicated. After exposure for the desired length of time, the effect on the color of the specimen may be defined by reference to the International Geometric Gray Scale.

Alternatively, the degree of yellowness resulting from the accelerated tests can be determined with a spectrophotometer or with a reflectometer or colorimeter having green and blue source-filter-photodetector combinations. This method for determining the degree of yellowness is known in the industry as the Hunter Whiteness Test and the procedure is described on pages 1056-1059 of the 1967 Book of ASTM Standards, part 30, published by the American Society for Testing and Materials, Philadelphia, Pa. Values are obtained in accordance with the procedure for lightness (L), whiteness (L-3b), and degree of yellowness ("b" value). A negative "b" value indicates blueness whereas positive "b" values indicate yellowness.

The following examples illustrate the process of the invention and the products obtained thereby. Unless otherwise indicated, all parts and percentages are by weight.

EXAMPLE 1

A knitted tricot fabric (fabric A) is prepared containing 22.6 percent Lycra (a Du Pont spandex) and 77.4 percent nylon. Another fabric (fabric B) is prepared containing 15.7 percent Lycra and 84.3 percent nylon. A powernet fabric (fabric C) also is prepared composed of 30 percent of a spandex fiber and 70 percent nylon filament yarn.

An aqueous solution containing 8 percent of tetrakis (hydroxymethyl) phosphonium chloride, 0.64 percent sodium hydroxide and 0.1 percent of a wetting agent is prepared. The treating bath is maintained at a temperature of about 75° to 80° C., and the fabric is immersed in the bath maintaining a liquor-to-fiber ratio of about 20:1. The fabric is maintained in the bath for one hour with occasional agitation to insure the uniformity of the exhaustion. After removing the fabric from the bath, it is rinsed in warm water and dried thoroughly.

The fabrics treated in accordance with this example are subjected to the gas-fume test described previously for a period of 16 hours whereupon the relative degree of yellowness is measured using the Hunter procedure described previously. In order to provide comparisons, samples of untreated fabric also are included in the tests. The durability of the treatment of the invention to washing is demonstrated by subjecting samples of the fabric to one complete wash cycle in a Kenmore automatic washer with 1 cup of detergent utilizing a warm wash water temperature of 50° C. prior to exposure to the gas fumes. The results of this test are shown in the following table I.

TABLE I.—FUME-FADING TEST RESULTS

| Fabric sample | Lightness (L) | Whiteness (L-3b) | Degree of yellowness ("b" values) |
|---|---|---|---|
| A (untreated) | 91.8 | 67.7 | +8.0 |
| A (treated) | 93.3 | 76.9 | +5.5 |
| A (treated) [1] | 93.6 | 79.5 | +5.1 |
| B (untreated) | 92.4 | 72.6 | +6.6 |
| B (treated) | 93.8 | 88.6 | +1.7 |
| B (treated) [1] | 93.8 | 90.7 | +1.1 |
| C (untreated) | 93.0 | 82.8 | +3.4 |
| C (treated) | 93.0 | 84.5 | +2.8 |
| C (treated) [1] | 93.3 | 86.2 | +2.4 |

[1] Samples given one wash before exposure to fumes.

The whiteness rating is the most meaningful value reported. The improvement resulting from the process of the invention is apparent when the results are compared to those obtained for the corresponding untreated fabrics.

EXAMPLE 2

Samples of the tricot and powernet fabrics described in example 1 are padded to 100 percent wet pickup with an aqueous bath containing 4.8 percent of tetrakis (hydroxymethyl) phosphonium chloride, 0.6 percent sodium hydroxide, 2.4 percent of Melrez MF (a melamine-formaldehyde resin available from Synthron, Inc.), 0.5 percent of hydroxylamine hydrochloride catalyst and 0.1 percent of a wetting agent. The padded fabrics are dried and cured at a temperature of 150°-160° C. for 1.5 minutes. The fabrics are then given an afterwash with 1 percent sodium carbonate and 0.1 percent wetting agent, rinsed and neutralized to a Ph of 4 with acetic acid. The neutralized fabric is dried at a temperature of 120° C.

Fabrics treated in this manner were subjected to the fume-fading test described previously. The results are reported in the following table II.

TABLE II.—FUME-FADING TEST RESULTS

| Fabric sample | Lightness (L) | Whiteness (L-3b) | Degree of yellowness ("b" values) |
|---|---|---|---|
| A (untreated) | 91.8 | 67.7 | +8.0 |
| A (treated) | 94.8 | 87.3 | +2.5 |
| A (treated) [1] | 95.0 | 89.7 | +1.8 |
| B (untreated) | 92.4 | 72.6 | +6.6 |
| B (treated) | 95.3 | 105.2 | -3.3 |
| B (treated) [1] | 95.3 | 106.7 | -3.8 |
| C (untreated) | 93.0 | 82.8 | +3.4 |
| C (treated) | 93.3 | 98.8 | -1.8 |
| C (treated) [2] | 94.3 | 103.3 | -3.0 |

[1] Samples given one wash before exposure to fumes.

EXAMPLE 3

The procedure of example 2 is repeated except that the aqueous bath contains 6.0 percent of the phosphonium chloride, 0.75 percent sodium hydroxide, 3.0 percent of melamine-formaldehyde resin, 0.5 percent of the catalyst and 0.1 percent of the wetting agent. Fabrics treated in this manner were subjected to the fume-fading test. The results are reported in the following table III.

TABLE III.—FUME-FADING TEST RESULTS

| Fabric sample | Lightness (L) | Whiteness (L-3b) | Degree of yellowness ("b" values) |
|---|---|---|---|
| A (untreated) | 91.8 | 67.7 | +8.0 |
| A (treated) | 94.6 | 87.4 | +2.4 |
| A (treated) [1] | 95.0 | 91.7 | +1.1 |
| B (untreated) | 92.4 | 72.6 | +6.6 |
| B (treated) | 95.0 | 108.5 | -4.5 |
| B (treated) [1] | 95.5 | 106.9 | -3.8 |
| C (untreated) | 93.0 | 82.8 | +3.4 |
| C (treated) | 95.3 | 103.4 | -2.7 |
| C (treated) [1] | 94.0 | 104.1 | -3.4 |

[1] Samples given 1 wash before exposure to fumes.

It can be seen that the results of the fume-fading test contained in tables II AND III are significantly better than those reported in table I. These significantly improved results are somewhat surprising in view of the fact that the difference in the treating baths, namely, the presence of the aminoplast resin and the catalyst, would not be expected to provide such a significant improvement since when fabric C is treated with various amounts of the melamine-formaldehyde resin and subjected to the fume-fading test, little or no improvement in whiteness or reduction in degree of yellowness is observed. For example, the whiteness rating for Fabric C treated with 7.2 percent of the resin and 0.5 percent of catalyst is 81.7 (control 82.8) and the degree of yellowness is +3.7 (control +3.4). The whiteness rating for fabric C treated with 9 percent of the resin and 0.5 percent of the catalyst is 81.3 (control 82.8) and the degree of yellowness is +3.8 (control +3.4). As in the previous examples, the control is an untreated powernet fabric subjected to the same test conditions. In view of these results obtained from the resin treatment, it is surprising that the combination of the resin and the phosphonium salt of examples 2 and 3 provide such improved results.

EXAMPLE 4

The procedure of example 1 is repeated except that the phosphonium salt is replaced by an equivalent amount of tetrakis (1-hydroxyheptyl) phosphonium chloride as prepared in U.S. Pat. No. 3,013,085.

EXAMPLE 5

The procedure of example 2 is repeated except that the phosphonium salt is replaced by an equivalent amount of tetrakis (1-hydroxypropyl)phosphonium bromide as prepared in example IV of U.S. Pat. No. 3.013,085.

What is claimed is:

1. A shaped structure of a long chain synthetic elastomer comprising at least 85 percent of a segmented polyurethane stabilized against discoloration by the presence having incorporated therein a phosphonium compound having the formula $$[RCH(OH)]_4P^+X^-$$

wherein R is hydrogen or an alkyl radical and X is a halogen or a hydroxy radical, said compound being present in an amount sufficient to stabilize the article from discoloration.

2. The structure of claim 1 wherein R is hydrogen.

3. The article of claim 1 wherein said phosphonium compound is present in an amount of from 0.1 to about 15 percent by weight of said structure.

4. The article of claim 1 wherein R is a lower alkyl radical and X is chlorine.

5. A shaped structure of a long-chain synthetic elastomer comprising at least 85 percent of a segmented polyurethane stabilized against discoloration by the presence of a coating of a phosphonium compound having the formula $$[RCH(OH)]c\text{-}4P^+X^-$$

wherein R is hydrogen or an alkyl radical and X is a halogen or a hydroxy radical, said compound being present in an amount sufficient to stabilize the article from discoloration.

6. The structure of claim 5 wherein the compound is present in an amount of from about 0.1 to about 15 percent by weight of the structure.

7. The structure of claim 5 wherein R is hydrogen and X is chlorine.

8. The structure of claim 5 wherein X is a hydroxy radical.

9. The structure of claim 1 wherein up to about 20 percent by weight of an epoxy, acetal, or aminoplast polymeric binder material also is present.

10. The structure of claim 5 wherein up to about 20 percent by weight of an epoxy, acetal, or aminoplast polymeric binder material also is present.

11. The coated structure of claim 5 wherein the structure is a fiber.

* * * * *